United States Patent
James et al.

(10) Patent No.: US 8,384,534 B2
(45) Date of Patent: Feb. 26, 2013

(54) COMBINING DRIVER AND ENVIRONMENT SENSING FOR VEHICULAR SAFETY SYSTEMS

(75) Inventors: Michael Robert James, Northville, MI (US); Michael Edward Samples, Ann Arbor, MI (US); Steven F. Kalik, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 475 days.

(21) Appl. No.: 12/687,599

(22) Filed: Jan. 14, 2010

(65) Prior Publication Data

US 2011/0169625 A1    Jul. 14, 2011

(51) Int. Cl.
*B60Q 1/00*    (2006.01)

(52) U.S. Cl. ........ 340/439; 340/903; 340/435; 340/576; 340/575; 382/103; 342/107

(58) Field of Classification Search .................. 340/439, 340/903, 435, 576, 575; 382/103; 342/107
See application file for complete search history.

(56) References Cited

U.S. PATENT DOCUMENTS

| | | | |
|---|---|---|---|
| 4,638,295 A | 1/1987 | Middlebrook et al. | |
| 5,835,613 A | 11/1998 | Breed et al. | |
| 6,060,989 A | 5/2000 | Gehlot | |
| 6,587,043 B1 | 7/2003 | Kramer | |
| 6,724,920 B1 | 4/2004 | Berenz et al. | |
| 6,859,144 B2 * | 2/2005 | Newman et al. | 340/576 |
| 6,989,754 B2 * | 1/2006 | Kisacanin et al. | 340/576 |
| 7,263,209 B2 | 8/2007 | Camus et al. | |
| 7,362,215 B2 | 4/2008 | Janssen | |
| 7,579,942 B2 | 8/2009 | Kalik | |
| 8,144,002 B2 * | 3/2012 | Kiuchi | 340/435 |
| 2002/0120374 A1 * | 8/2002 | Douros et al. | 701/29 |
| 2004/0150514 A1 * | 8/2004 | Newman et al. | 340/435 |
| 2004/0178890 A1 * | 9/2004 | Williams et al. | 340/425.5 |
| 2004/0239509 A1 * | 12/2004 | Kisacanin et al. | 340/575 |
| 2004/0254729 A1 * | 12/2004 | Browne et al. | 701/301 |
| 2006/0001531 A1 | 1/2006 | Waterman | |
| 2006/0106538 A1 * | 5/2006 | Browne et al. | 701/301 |
| 2008/0085686 A1 | 4/2008 | Kalik | |
| 2008/0103697 A1 | 5/2008 | Caminiti et al. | |
| 2008/0154438 A1 | 6/2008 | Kalik | |
| 2008/0291032 A1 | 11/2008 | Prokhorov et al. | |
| 2009/0150017 A1 | 6/2009 | Caminiti et al. | |
| 2009/0204600 A1 | 8/2009 | Kalik et al. | |
| 2009/0243880 A1 * | 10/2009 | Kiuchi | 340/903 |
| 2010/0253526 A1 * | 10/2010 | Szczerba et al. | 340/576 |
| 2010/0253598 A1 * | 10/2010 | Szczerba et al. | 345/7 |

* cited by examiner

*Primary Examiner* — Hoi Lau
(74) *Attorney, Agent, or Firm* — Gifford, Krass, Sprinkle, Anderson & Citkowski, P.C.

(57) ABSTRACT

An apparatus for assisting safe operation of a vehicle includes an environment sensor system detecting hazards within the vehicle environment, a driver monitor providing driver awareness data (such as a gaze track), and an attention-evaluation module identifying hazards as sufficiently or insufficiently sensed by the driver by comparing the hazard data and the gaze track. An alert signal relating to the unperceived hazards can be provided.

17 Claims, 8 Drawing Sheets

COMBINING DRIVER AND ENVIRONMENT SENSING FOR VEHICULAR SAFETY SYSTEMS

FIELD OF THE INVENTION

The invention relates to apparatus and methods for improving vehicular safety.

BACKGROUND OF THE INVENTION

Vehicular safety is an area of great concern and importance. Hence, methods and apparatus to improve vehicular safety would be of great value.

SUMMARY OF THE INVENTION

Vehicular safety can be increased by improving operator awareness of hazards within the vehicle environment. However, attempting to alert a vehicle operator to all possible hazards would lead to an excessive number of alerts, causing such a system to become dangerously distracting itself, and more likely to be ignored or disabled.

The usefulness of hazard warnings is enhanced if the warnings relate to hazards outside the awareness of the vehicle operator. An example vehicular safety system comprises an environment sensor system, a vehicle operator monitor (e.g. driver monitor), an attention-evaluation module, and a warning system. The attention-evaluation module compares hazards within the environment (detected by the environment sensor system) with driver awareness, which may be estimated using gaze tracking to determine which hazards the driver has perceived.

The number of hazard alerts can be greatly reduced by selectively providing hazard warnings for hazards that the driver has not looked at, or is otherwise known to be unaware. By reducing the number of alerts, the usefulness of the apparatus is greatly enhanced. The absence of unnecessary alerts makes the alerts given more useful to the driver, and makes it less likely that the driver will disable or ignore the system.

Hence, an improved accident prevention system can be provided by using a combination of inward-facing sensors, monitoring the driver, and outward-facing sensors that monitor the vehicle environment. In this context, an inward-facing sensor may be directed towards the driver, and an outward-facing sensor is directed towards the exterior environment of the vehicle. The vehicle operator may be the driver of a land vehicle, such as an automobile, and for conciseness the term "driver" is used in examples below. However, examples of the invention also include vehicle safety systems for other vehicles, such as boats, aircraft, and the like.

An example apparatus for assisting safe operation of a vehicle includes an environment sensor system that detects hazards within the vehicle environment, a driver monitor that monitors the driver and provides driver awareness data (such as data related to attention focus), and an attention-evaluation module that identifies perceived (e.g. seen) hazards and unperceived hazards by comparing the hazard data and the driver awareness data. The perceived hazards are those that the driver is aware of, or for which driver awareness can reasonably be assumed or inferred based on driver awareness data.

Hazard data may include hazard location for a particular hazard as a function of time, such as time-stamped hazard location data. Predicted location data for hazards can also be used. The driver awareness data includes data related to the direction of focus of the driver's awareness, such as a gaze track. In particular, determination of the gaze track allows inference or identification of perceived and unperceived hazards (i.e. sufficiently and insufficiently observed hazards). Gaze track data may include a gaze track for the driver, and may include eye fixation data, which may include the direction and duration of eye fixation for the driver. An optional hazard alarm can be used to provide alerts to the driver, with priority given to unperceived hazards, which may be unobserved and/or obscured. Hazards may be categorized in two classes: "sufficiently sensed" or "insufficiently sensed, or as "sufficiently observed" or "insufficiently observed". In some examples, hazards may be categorized in two or more categories, such as "perceived" (gaze on hazard or gaze vector to hazard), and "unperceived" (no gaze on hazard or gaze vector to hazard). An optional additional category is "insufficiently perceived" hazards. Insufficiently perceived hazards include obscured hazards, in which the gaze vector is directed to the hazard, but an obstruction prevents the entirety of the hazard from being perceived. An example is a pedestrian approaching the road from behind a parked vehicle, the parked vehicle obstructing a clear view of the pedestrian. The category "insufficient perceived" may also include cases where gaze fixates something briefly, but may not allow a sufficiently accurate mental model to be formed, relative to what the vehicle sensors have captured. For example, a person may glance at another vehicle, but not long enough to perceive the relative speed of the vehicle.

A novel combination of environmental sensing, driver monitoring, and comparison of data from these systems allows information to be given about potentially dangerous situations where the driver is unlikely to be aware of the danger. Advantages include the reduction of unnecessary warnings, and enhanced usefulness of the warnings given. For example if the driver monitor detects the driver has seen an approaching vehicle or other hazard, no additional warning need be given in relation to that approaching vehicle or other hazard unless there is a change in the behavior of that hazard that the driver has not yet observed.

An environment sensor system can be configured to sense and detect objects within the environment, such as other vehicles, traffic control signals, pedestrians, and the like. In some examples, all detected objects may be considered hazards. In some examples, hazards are a sub-set of all detected objects, for example those objects posing a threat to the vehicle as determined by factors such as size, relative position to the vehicle, position relative to the projected travel path of the vehicle (e.g., a road), velocity, acceleration, and/or other factors.

An environment sensor system may comprise one or more sensors, for example radar, laser rangefinders, video sensors, and the like. The environment sensor system may further include a processing module receiving the sensor signals and detecting one or more hazards within the environment. A driver monitor may comprise one or more sensors directed inwards towards the vehicle cabin, and may include sensors such as a camera, 3D time of flight sensor, and the like, which can be configured for gaze tracking. Other information about the driver can also allow estimation of the driver's state and knowledge of the environment, such as head or body pose. For pose, estimates can be drawn not only from cameras, but also from sensors such as: pressure sensors (on seats, steering wheels, or in other places with which the driver might make contact) to indicate distributions of weights and forces by the driver; ultrasonic, capacitive, optical or other proximity sensing systems near which the driver might place themselves; chemical sensors that can detect vapors or chemicals given off by the body (for example sweat during nervousness or alcohol if the driver has been drinking), or other sensors. Sensors may monitor the pose, medical or other physiological condition, emotional condition, or other condition of the driver.

Environmental sensors may include sensors also used for other functions such as adaptive cruise control sensors. These may include radar sensors. For example, a radar sensor may be used to identify vehicles having changing relative speed relative to the vehicle. The vehicle speed may be adjusted to avoid a collision, or an alert provided to the driver.

A driver monitor can use one or more sensors, for example using computer vision algorithm based driver monitoring. Such sensor systems may also be used to detect driver problems such as tiredness or lack of attention. The driver monitor may be used to track head and eye movements using conventional computer vision algorithms. For example, the gaze track of a person may be required to pass over a hazard, or close to a hazard (for example, within a certain threshold such as angular and/or distance separation from the hazard). For example, unperceived hazards may be outside a predetermined angular separation from the gaze track, the predetermined angular separation being in the range 1°-10°.

A driver monitor may include at least one image sensor, such as a video camera, providing image data, and a driver monitor processing module operable to determine a gaze direction from the image data. For example, head orientation and/or eye orientation may be detected and used to determine gaze track.

Driver awareness data may further include eye fixation time data, relating to gaze fixations within the gaze track. In some examples, the gaze may be required to fixate for a certain threshold time. For example, at least some hazards may require an appreciable eye fixation time to be identified as perceived hazards. These hazards may include serious hazards, posing a great danger to the vehicle and possibly unlikely to take action themselves to avoid the hazardous condition. For example, serious hazards may include a stop sign, red traffic signal, stopped vehicle in a traffic lane, animal, pedestrian within a travel lane, and the like.

If a gaze track passes over (or close to, for example within a threshold angular separation from) a hazard, the hazard may be identified as a "perceived hazard" that the driver is aware of. Unperceived hazards may have hazard locations outside a predetermined distance from the gaze track. In various examples below, perceived and unperceived hazards are discussed, but a driver monitor may further or alternatively track other measures of driver awareness. In some examples, a gaze fixation does not require complete stoppage of eye movement. A gaze fixation may be determined as an intersaccadic interval, which may be detected by the eye tracker. Gaze may jump from object to object or location to location (called a "saccade"), or remain on an object or location (referred to as fixation). But, even in a fixation the gaze may remain on an object, even if the object is moving, so long as it moves at a rate such that the eye can track it reasonably well without having to make large fast jumps. A gaze fixation occurs during the period between saccades, i.e. during an intersaccadic interval. When gaze stays on an object that is moving relative to the observer, the eyes follow the objects movement closely using smooth pursuit movements that can be referred to both as tracking the object (to emphasize the movement of the object while gaze is maintained on it), or as fixating the moving object. The term fixation in relation to a moving object does not require a total stoppage of eye motion. Rather, it is the selection of a single target, even though that target may be moving at eye-trackable relative speeds which use the brain's smooth pursuit system to track a moving object. Hence, the intersaccadic time interval between saccade eye movements may also be referred to as a fixation period, when a static or quasi-static image is being observed in between saccades.

A perceived hazard may remain categorized as "perceived" after the driver's gaze passes over the hazard, e.g. for a predetermined time such as 1-10 seconds. A perceived hazard may be re-categorized as "unperceived" if the environment sensor system determines that the hazard is behaving in an unpredictable manner. Unpredictable behavior by an object may include changing its behavior from a model constructed during the last gaze placement, or behaving in an unpredictable manner regardless of the last gaze placement. Unpredictable behavior could happen as a result of the hazard accelerating, decelerating, or changing direction compared to the hazard's state during the last observation. A perceived hazard may also be re-categorized as unperceived after a predetermined time passes after the driver last looks at the hazard. Further, warnings may also be provided for newly appearing behaviors (unpredicted behaviors) from existing objects. These can be just as dangerous and important as cases where the overall ability to predict behavior is limited or where the object is new. For example, another vehicle may speed up, slow down, change direction, in a manner that is unpredictable to the driver based on driver monitoring, and an alert may be given. Additionally, a perceived hazard may fail to change its behavior in a predictable way even as the environment around it changes in a way requiring behavioral changes (for example failing to slow down to stop, despite the presence of a stop sign or stop signal in the environment; or failing to begin a turn even as the road curves), also shifting the state of awareness from perceived hazard to the state of unperceived hazard if the driver has not re-checked that hazard to evaluate its state, and to update the driver's model of the hazard's behavior.

The attention-evaluation processing module combines data from environmental sensors and driver monitor sensors, and evaluates whether the driver has given sufficient attention to each potential hazard. The output may comprise a set of warnings about potential hazards, selecting such warnings according to whether the driver is likely to be aware of each hazard. For example, alerts can be given to the driver about dangerous situations through a human-machine interface. An alert may include information relating to one or more hazard parameters. Hazard parameters may include distance, relative speed, direction (e.g. angle to a reference direction, such as direction of travel), size, hazard identity, or other information. For example, direction to a hazard may be indicated using the apparent direction of origin of an audible alert, or a visually discernable arrow. In some examples, a vehicle control module may be used to adjust the vehicle trajectory in response to a hazard, for example using braking, engine speed control, steering, or other vehicle control signals.

An attention-evaluation module may be an electronic circuit, such as a computer, operable to compare the hazards within the environment detected by the environment sensor system with the driver's awareness of the environment. The driver's awareness may be determined as the hazards within the environment that the driver's gaze has passed near or passed over. In some examples, the driver can be presumed to be aware of hazards that they have looked at, for example as determined by gaze tracking. However, there may be objects at which a driver has looked, about which the driver needs additional warnings because the driver does not appear to have properly predicted that object's current movements and/or state. The attention-evaluation module allows warnings to be given selectively for hazards within the environment that the driver monitor determines that the driver has not perceived, has not perceived well enough, or has not perceived since the object began to change its behavior.

An apparatus can further provide warning signals (such as audible, visual, and/or haptic alerts) when potentially dangerous driving situations are identified. These potentially dangerous situations may include situations where a hazard exists, detected by the outward facing sensors, and of which the driver is not aware as determined by the inward facing sensors. Warnings can potentially be used in either a human-machine interface that give the driver additional safety information, such as alerts, or in a protective system in which the vehicle responds automatically to avoid the hazard and all simultaneously occurring others autonomously.

In the latter example or others of its like, signals from the attention-evaluation module can be sent to a vehicle control module that may be used to adjust the vehicle's operation, for example through actuation of braking, acceleration, or steering adjustments.

An example method for assisting safe operation of a vehicle by a driver includes monitoring the vehicle environment using environment sensors supported by the vehicle to obtain hazard data, monitoring the driver to obtain driver awareness data, the driver awareness data including gaze direction data, comparing the hazard data and the driver awareness data to identify perceived hazards and unperceived hazards, and providing alerts to the driver relating to the unperceived hazards. The gaze direction data includes a gaze track over a predetermined time period, the gaze track not passing over or close enough to the unperceived hazards during the predetermined time period.

DETAILED DESCRIPTION OF THE PREFERRED EMBODIMENTS

In examples of the present invention, a model of the environment can be generated using one or more environment sensors, such as sensors associated with the vehicle and directed outwards (relative to the driver) towards the vehicle environment. A processing module can be used to track objects within the environment detected using the environment sensors (which may include radar sensors, laser sensors, and the like). The gaze of the driver is monitored, and the gaze track is correlated with objects identified in the environment, for example objects being tracked within the environment model.

For example, a driver may look to the left prior to making a lane change maneuver, and then start to perform the maneuver. There may be another vehicle within the left lane. A system may first determine whether the second vehicle is a hazard, based on position and relative velocity. Gaze tracking can be used to determine if the driver is aware of the second vehicle, and no alert is given if the driver is alert to the hazard. However, in some examples, gaze tracking may indicate that the driver is not aware of a hazard, such as second vehicle, so that a warning may be usefully given.

In some examples, a hazard that is categorized as a perceived hazard may be recategorized as an unperceived hazard, for example if it behaves in an unpredictable or unpredicted manner after a previous observation, for example changing direction, slowing, or accelerating compared to its previous action or state.

Approaches according to examples of the present invention allow elimination of unnecessary warnings and takeover of control systems where appropriate. An example apparatus comprises one or more environment sensors, an environment sensor processing module operational to generate a list of hazards, one or more driver monitor sensors, and a driver monitor sensor processing module that estimates the location of human attention focus. The locations can be given time labels. An attention-evaluation information processing module then compares data from the environment monitoring system and driver monitor, and is configured to evaluate whether the human has given sufficient attention to each potential hazard.

Figure 1:
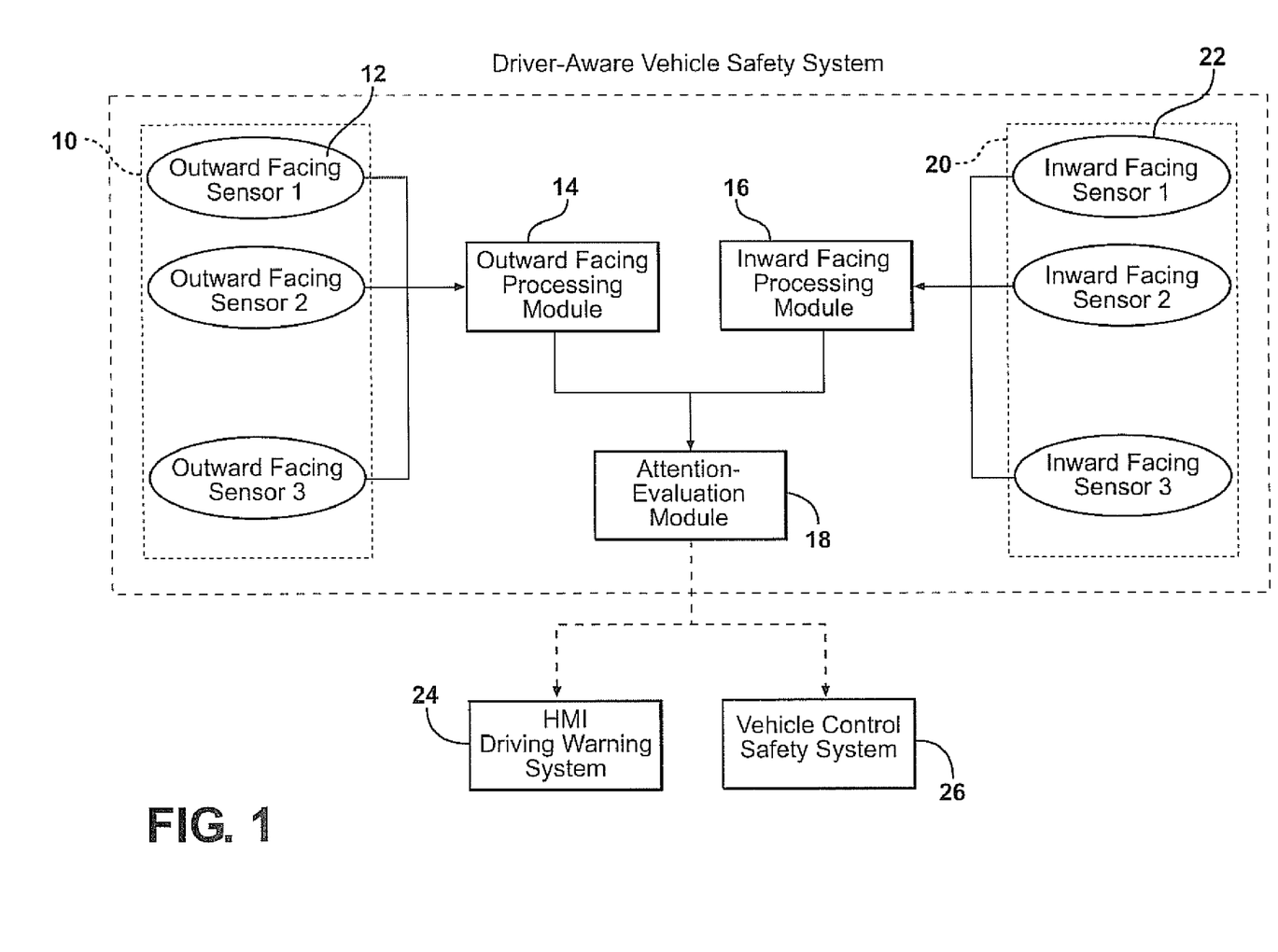
FIG. 1 is a schematic of a driver aware vehicle safety system.

FIG. 1 is a schematic of an example driver-aware vehicle safety system. The apparatus comprises a plurality of environment sensors 10, such as sensor 12. Environmental sensor data is passed to first processing module 14, operable to detect hazards in the vehicle environment. A driver monitor comprises a plurality of driver monitor sensors 20, such as sensor 22. There may be one or more sensors, and multiple sensors may be the same or different and may carry similar or different information from each other. Sensor data from the driver monitor sensors is sent to second processing module 16. The attention-evaluation module 18 compares the outputs of the first and second processing modules in order to determine which hazards within the environment, as detected by sensor system 10, have not been recognized by the driver. Outputs from the attention-evaluation module 18 may be passed to a driver warning system 24 and/or a vehicle control safety system 26.

In this example, the environmental sensor system includes the plurality of environment sensors and the first processing module, and the driver monitor includes the plurality of driver monitor sensors and the second processing module. However, sensor processing and the comparisons of the attention-evaluation module may be performed by a single electronic circuit, such as a computer including a processor, memory, clock, and other conventional components.

Figure 2:
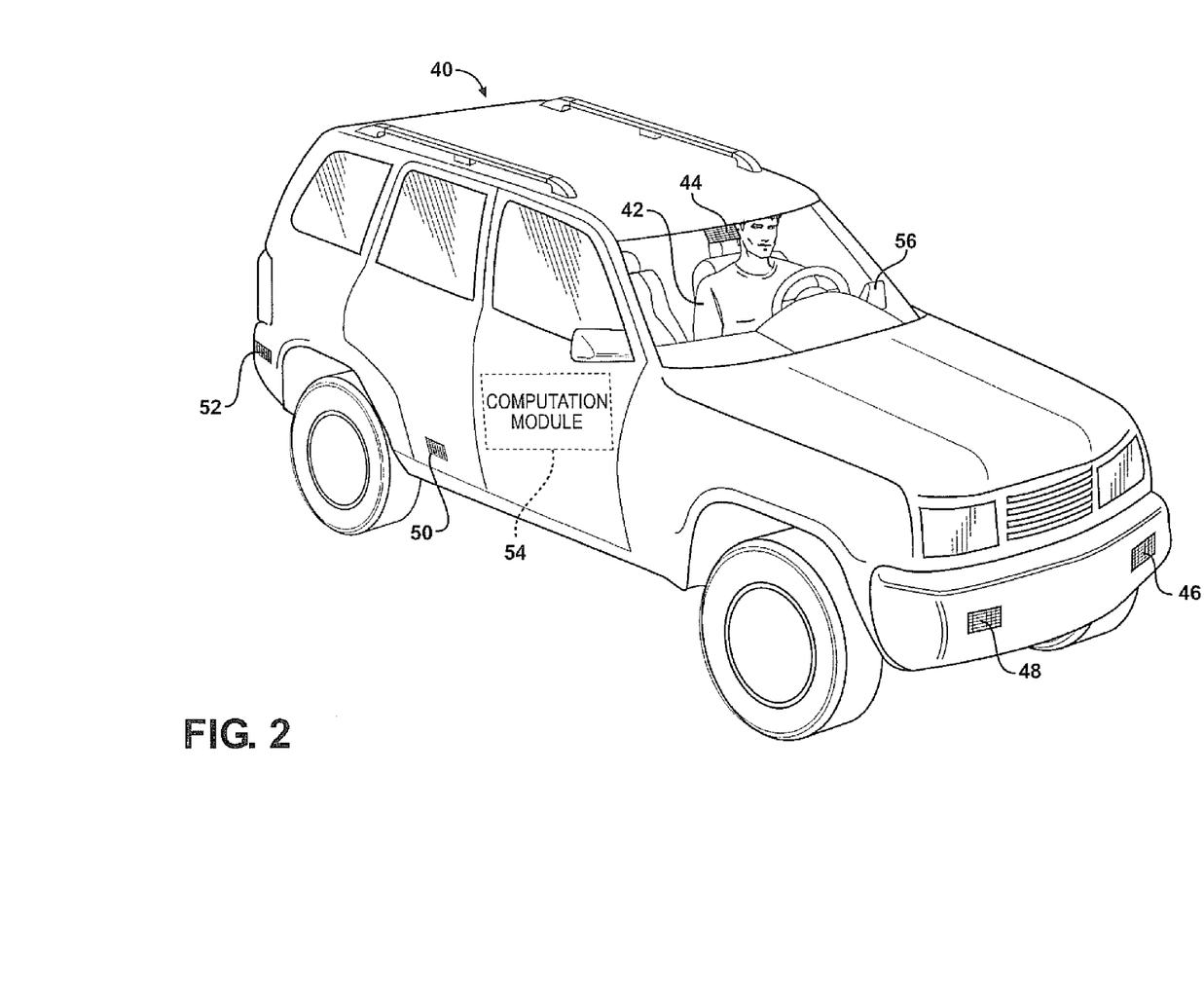
FIG. 2 is a simplified figure showing a possible arrangement of sensors around a vehicle.

FIG. 2 shows a vehicle 40 having driver 42. One or more inward facing sensors 44 monitor the driver's head position, eye position, or other related driver physical pose elements so as to estimate the focus of attention of the driver as a function of time. In this way, a gaze track can be determined. A plurality of outward facing sensors (such as 46, 48, 50, and 52) is used to sense the exterior environment of the vehicle. Example sensors may include Velodyne™ lidar sensors (Velodyne Lidar Inc., Morgan Hill, Calif.) and Sick™ laser rangefinders (Sick AG, Waldkirch, Germany). For example, the environment sensors may include radar sensors, laser sensors, optical imaging sensors, other sensors, or any combination thereof. An inward facing sensor may be a video sensor, time of flight sensor, other sensor providing information relating to the driver.

The figure also shows a computation module 54 which receives sensor data or data from the processing modules associated with environment and driver monitoring. The functions of the processing modules and attention-evaluation module may be provided by one or more components, such as one or more electronic circuits such as the computation module, and may be combined into a unitary device such as a computer.

FIG. 2 also shows a speaker 56, which can be used to provide spoken or other audible alerts to the driver, for example using stereophonic or quadraphonic effects to provide directional information related to the hazard. Visual alerts, such as arrows, flashing lights, and the like, may also be provided through visual elements on this component, or through other display types ranging from localized modules to heads-up displays.

Figure 3:
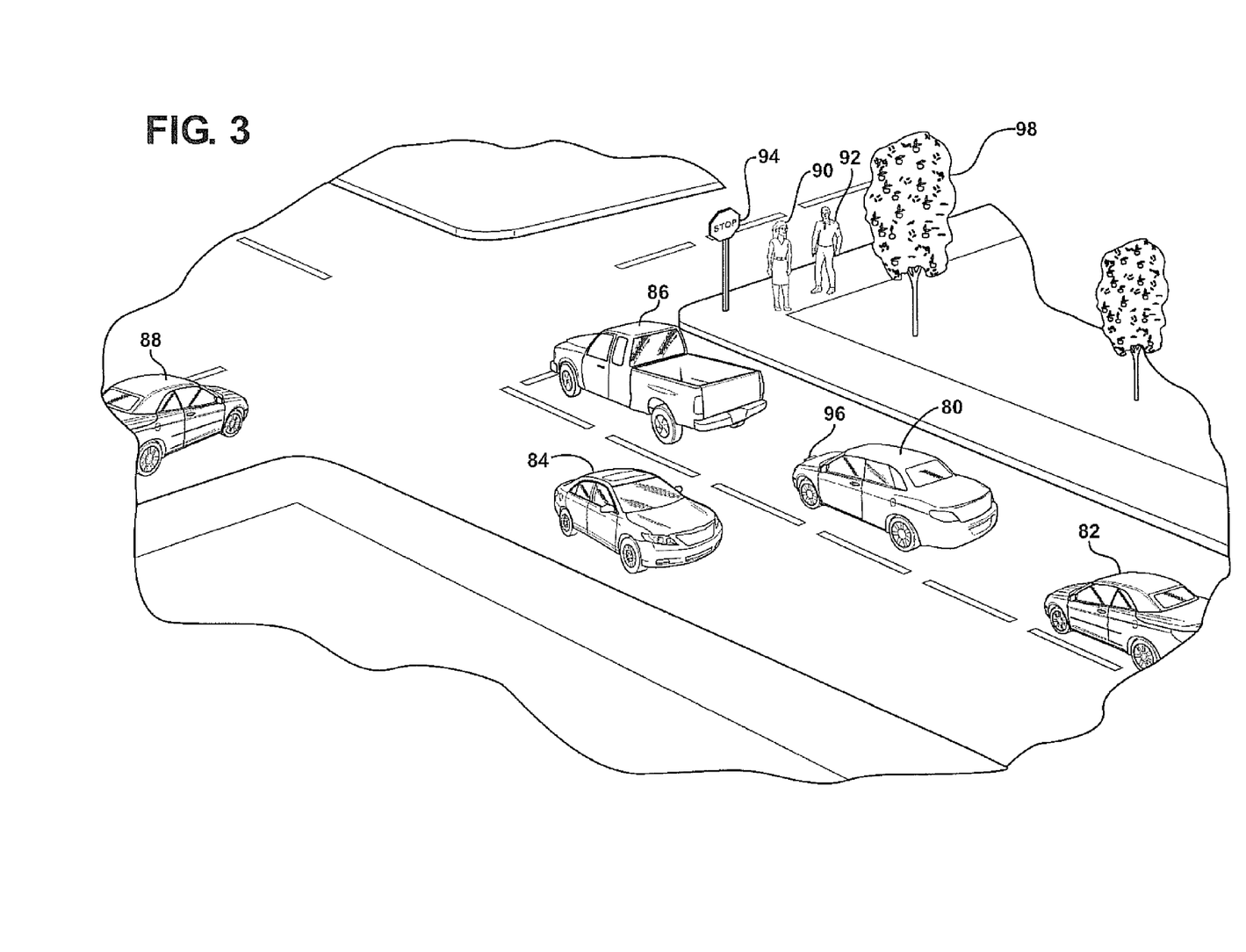
FIG. 3 shows an environment containing a plurality of hazards, some of which have not been seen by the driver.

FIG. 3 shows a vehicle 80 within a representative vehicle environment comprising other vehicles 82, 84, 86, and 88; pedestrians 90 and 92; and a stop sign 94. An apparatus, in the form of a vehicle safety system, is associated with the vehicle 80, comprising an environmental monitoring system, driver monitor, and attention-evaluation module (for example, as illustrated in FIG. 1). The environment monitoring system of the vehicle 80, comprising sensors such as sensor 96, can identify a plurality of hazards in a relatively short time scale, and label such hazards for dynamic tracking. The sensor may point in more directions than illustrated to provide a larger field of view outside the vehicle. Further, the environment monitoring system is rapidly responsive to dynamic changes within the environment, such as changes in speed, direction, and/or acceleration of identified objects. In contrast, a vehicle driver may not be able to so rapidly identify changes within the environment.

For example, the environment sensor system of the vehicle may be able to detect and track all labeled hazards, along with other objects that are within the environment. Static objects, such as tree 98, may, but need not, be identified as hazards unless in the predicted path of the vehicle.

Using a gaze track obtained using the driver monitor, the attention-evaluation module may identify hazards that have not been looked at by the driver (unseen hazards), to indicate which hazards' states and locations the driver is less likely to be recently aware, which may include hazards for which the driver has not recently refreshed their knowledge or information. For example, by monitoring the attention of the driver, it may be detected that the stop sign 94 has not been noticed by the driver. In that case, an alert specifically directed to the presence of stop sign 94 may be given.

Further, a vehicle such as 88 may be initially concealed, and then appear abruptly in the vehicle environment. The vehicle sensors (the environmental monitor system) may detect the new hazard almost immediately, for example in less than 0.1 seconds. A warning may be given immediately, or in some examples, a driver may be allowed a predetermined time period to see a newly emerged vehicle before a warning is given.

Figure 4:
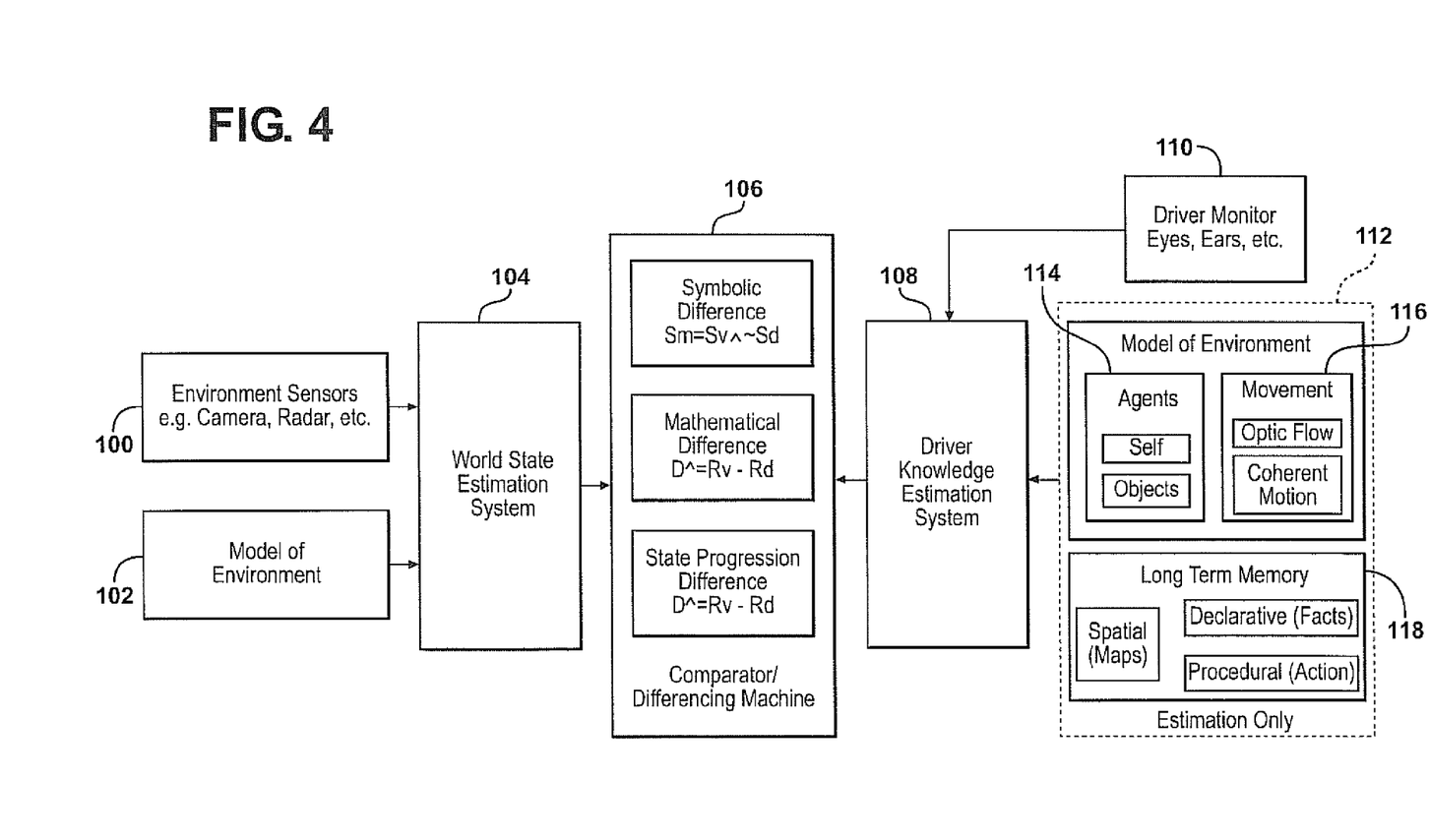
FIG. 4 shows a schematic for a cognitive system based driver assistance system.

FIG. 4 is a further schematic illustration of an example driver assistance system, in which world models, based on real-time environment sensing, are compared with driver awareness estimates based on monitoring of driver observations and an optional driver memory model. The apparatus comprises environment sensors 100, an environment model 102, a world state estimation system 104, a differencing machine 106, a driver knowledge estimation system 108, and models of driver sensors 110 and mental representation of the environment 112. For estimation of the driver's awareness, a model of the environment can be made in terms of detected objects 114, detected movement 116, and memory 118. The environment model 102 may contain information about the environment from a variety of sources including maps, past recorded experience, and communicated information.

The estimated driver's mental model of the environment (112) may include estimates of self-awareness, object awareness (including hazard awareness if the objects are hazards), and estimates of the driver's awareness of object relative motion, for example from apparent optic flow effects and apparent coherent motion. The estimated driver's mental model may include a model of long-term memory 118, for example how the driver maps the environment, and memory models for retention of object types and actions thereof.

For example, a person may sense a hazard within the environment that is moving at a constant speed. A driver awareness estimation system may estimate that the person is aware of that hazard's motion based on previous observations. However, if a hazard such as another vehicle starts behaving in a way different from the current prediction, for example by changing direction or accelerating at a time different than when predicted, the environment model 104 will be different from the modeled awareness unless the driver further observes the hazard. In such an example, a difference between the actual environment model 104 and the estimate of the driver's awareness 108 can be determined and used to provide an alert to the driver.

In the example of FIG. 4, the function of the attention-evaluation module is provided by the differencing machine 106 comparing estimations of environment and driver awareness (104 and 108, respectively). Processing modules for the sensor systems are not shown for illustrative simplicity, but this functionality may be included into the relevant estimation systems, or associated with the sensors. The differencing machine may include one or more comparator functions, such as symbolic, mathematical, or state-progression differencing machines.

In some examples, the driver's awareness may itself be modeled, in terms of the detection of objects, the awareness of movement, and the person's memory in terms of spatial relationships and likely facts and actions related to the environment.

Figure 5A:
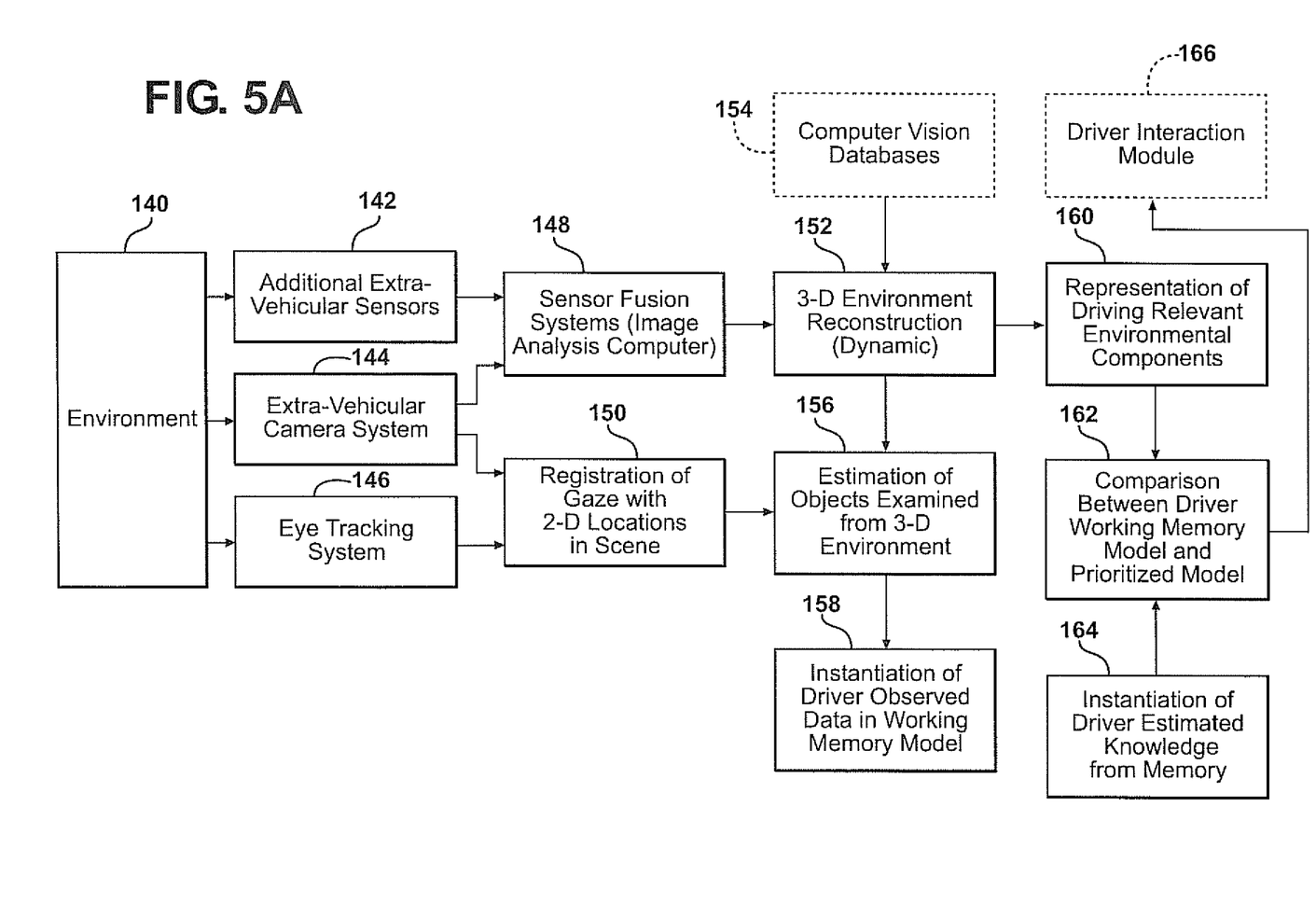
FIGS. 5A-5C illustrate further schematics for an example driver support system.

FIG. 5A shows a schematic of a gaze based cognitive system for driver support. The figure shows the environment 140 detected by an extravehicular camera system 144. Additional sensors may be provided at 142. Vehicle sensor data is passed through a sensor fusion system 148 and passed to a 3D environment reconstruction 152. The reconstruction 152 may also receive data from external databases such as computer vision database 154. The output of the environment reconstruction is used to form a representation of driving relevant environmental components at 160. These may be more simply referred to as hazards, even though these components may not necessarily be hazardous. An eye tracking system at 146 tracks the gaze direction of the vehicle operator. The output of the eye tracking system is used to provide an estimation of objects examined within the environment at 156, for example as gaze track data. A registration of the gaze with locations in the environment is provided at 150. A model of the driver memory is optionally used at 158. The working memory model 158 receives the object estimation from 156 and uses that to provide an estimate of driver knowledge at 164. The driver estimated knowledge is compared with the representation of hazards from 160 at comparator 162. Any hazards that have not been looked at by the driver may be detected in this comparison and a suitable alert provided or action taken through driver interaction module 166.

Figure 5B:
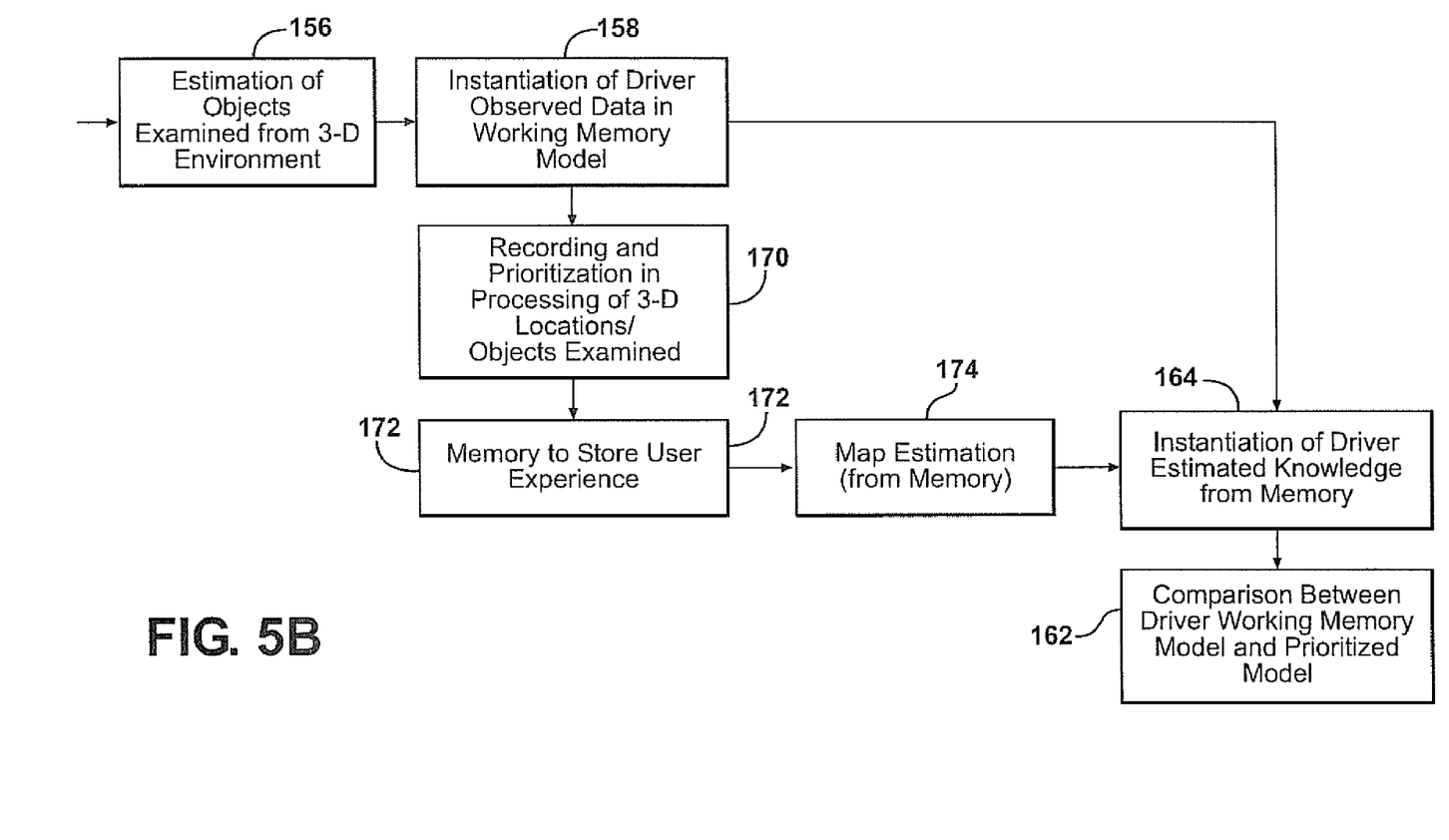

FIG. 5B shows further details of a driver model, in which a processing block 170 records and prioritizes objects examined by the driver. The memory used to store the user experience is shown at 172, allowing an estimation of a local map at 174. The output of the map estimation 174 is provided to the instantiation of driver estimated knowledge from memory at 164. In this figure components 156, 158, 164 and 162 are those shown in FIG. 5A.

Figure 5C:
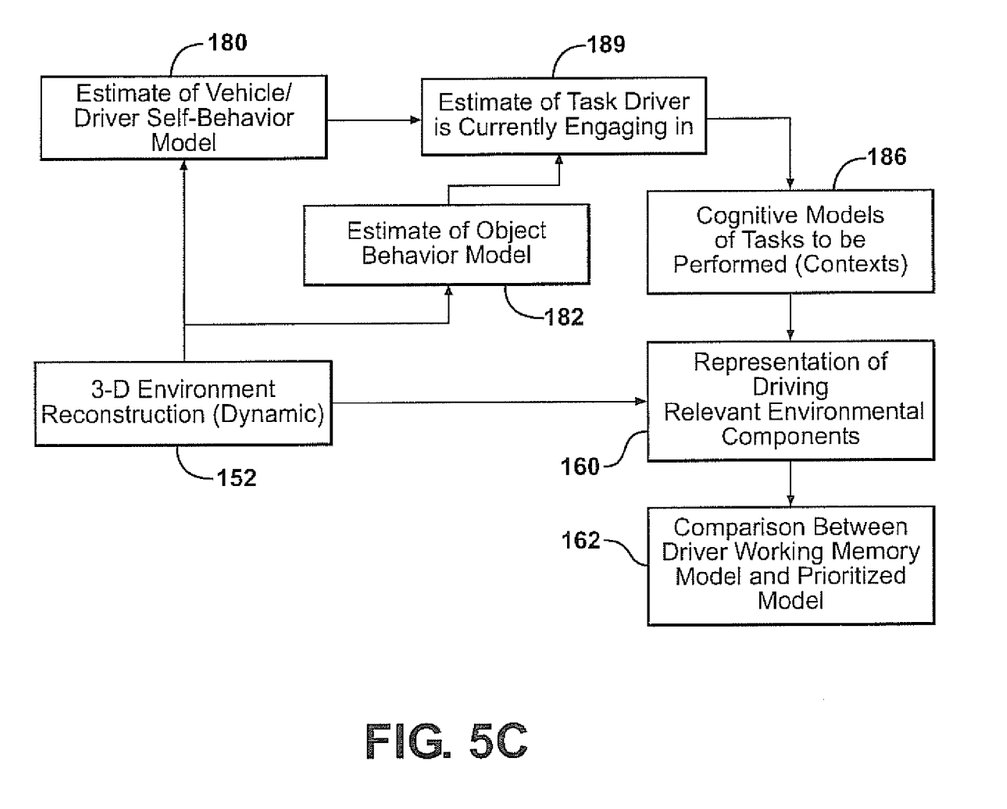

FIG. 5C shows a slightly more sophisticated driver and environment model. The environment reconstruction at 152 is combined with an estimate of the vehicle and driver behavior model at 180. This model may be personalized to the driver and/or the particular vehicle. Further, an estimative model used for the object behavior is provided at 182. The combination of the self behavior model from 180 and the object behavior model from 182 is combined at task estimator 184 to give an estimate of the task the driver is currently engaged in. This allows a cognitive model of tasks to be performed to be provided at 186. These models can be used to improve the representation of hazards at 160. In this figure the components 152, 160 and 162 are those shown in FIG. 5A.

Figure 6A:
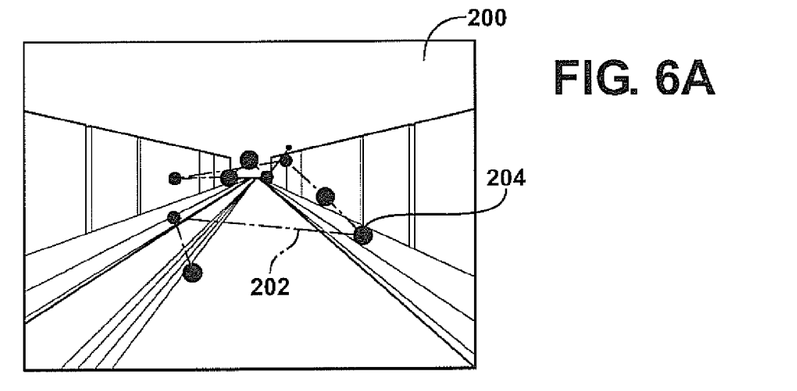
FIGS. 6A-6C show examples of gaze tracking.

Driving and environment experience can influence the driver's awareness of the environment. FIG. 6A shows an expert driver within a familiar environment having an efficient visual scan of an environment detecting most hazards. The figure shows the gaze track 202 through the environment 200, with visual fixation points such as those shown at 204.

A gaze tracking system may follow the gaze track, and detect and quantify fixation times. The circle size at each fixation is correlated with fixation time, which can be determined by a driver monitor system. In some examples, a fixation time greater than a predetermined threshold may be required for a person to be aware of a hazard.

Figure 6B:
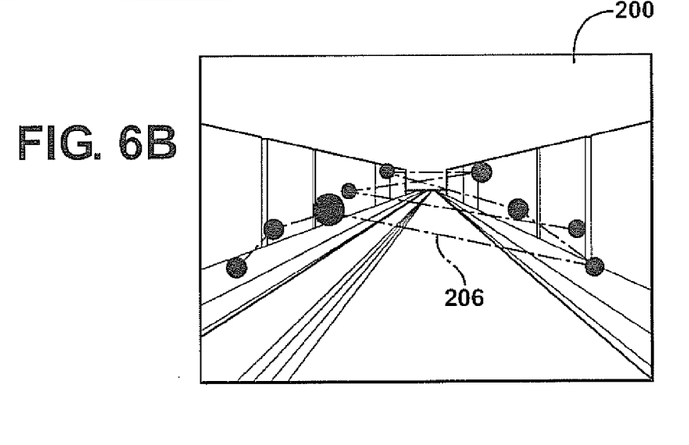

FIG. 6B shows a beginning level driver within a familiar environment, showing bias towards driving cues with good recognition of related spaces. Location knowledge guides fixation (no driving bias).

Figure 6C:
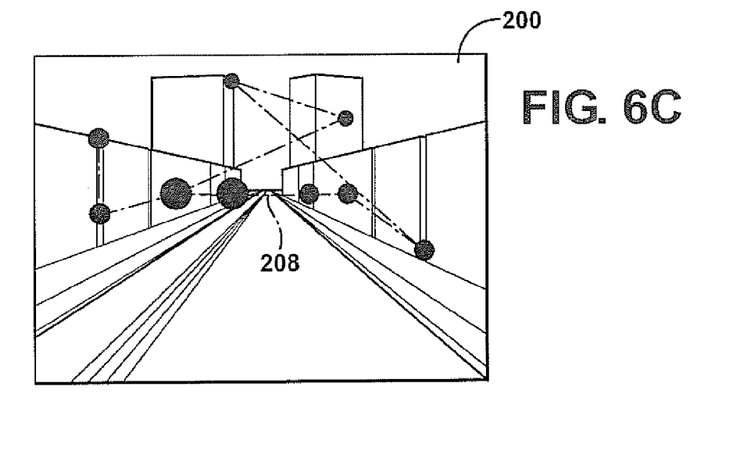

FIG. 6C shows a beginning level driver within a less familiar environment. In such examples, the driver's gaze moves in a sometimes random manner around the environment, and the gaze may fixate on points unlikely to be correlated with hazards to the vehicle. For example, the driver may view objects based on natural contrast, color, and the like. Fixations are biased by familiar and new locations.

The danger to the vehicle may be enhanced in the case of inexperienced drivers, or in the case of experienced drivers within an unfamiliar environment. A system may be programmed to detect the experience of the driver from the pattern of visual observations of the environment. A system may also be configured to determine whether the vehicle is in an unfamiliar environment, for example from location data such as GPS data. In such more hazardous situations, the number of warnings may be increased.

An estimate of the driver's world, in terms of hazards sensed within the environment, can be determined from a recent gaze track. The gaze track can be used to estimate the driver's current observations and knowledge of the state of the environment.

In some examples, a driver's gaze track may be compared to an expert driver's gaze track, to evaluate driver skill and also to facilitate detection of missed hazards. This may be part of improved driver evaluation, licensing, or training.

For example, an experienced driver may drive through an environment and the gaze of the experienced driver is tracked. The track and fixation points can be stored in a database. A second vehicle passing through the same environment may retrieve data from this database to facilitate detection of hazards.

Algorithms

An algorithm can be used to determine if there are potentially dangerous situations outside the vehicle that the driver is not aware of. Environment sensors are used to detect potentially dangerous situations outside the vehicle within a past time interval. The location of driver focus within a second time interval is then determined. Warnings can be given for hazards detected by the environment sensors that are not within the set of locations of driver focus within a past time interval.

The vehicle environment determined by the environment sensors may be dynamically updated at quite a rapid pace. For example, updates may occur at time intervals of 1 second or less. The memory of the driver can be modeled or otherwise estimated, so that a person is assumed to remember the existence of a hazard within the second time interval.

The regions of driver awareness can be estimated as regions within the environment within a certain distance of the gaze track. The distance function used may be a Euclidean distance, angular separation, or any other distance function that is useful for the sensor modalities used.

In some examples, an alert is not given immediately on sensor detection of a hazard. The driver may be given a time period to visually become aware of the hazard, for example a period of between 1 and 3 seconds. A system may give a driver a chance to recognize a potential hazard by allowing the relevant time periods to extend into the future from the current model.

An example system comprises an environment sensor system, such as one or more outward facing sensors and an outward sensor processing module that generates a set of hazards outside the vehicle, with approximate location and time labels. The system further comprises a driver monitor, such as a plurality of inward facing sensors, and an inward sensor processing module that estimates location of human attention focus, with time labels, and an attention-evaluation module that combines data from outward and inward processing modules, operable to evaluate whether the human operator (e.g. driver) has given sufficient attention to each dangerous situation (hazard).

The attention-evaluation module may use the following algorithm to decide whether there is a potentially dangerous situation outside the vehicle that the human is not aware of.

1. Input the set D of potentially dangerous situations outside the vehicle within the past time interval tD.
2. Input the set F of location of driver focus within the past time interval tF.
3. For each situation d in D do
4.     Let L(d) be the approximate location of d and let T(d) be the time of d, and set Warn(d) = true
5.     For each area of focus f in F do
6.         Let L(f) be the approximate location of f and let T(f) be the time of f
7.         If the distance D(L(d), L(f)) < CutoffD and time difference E(T(d), T(f)) <CutoffT, set Warn(d) = false
8.     End For
9. End For
10. For each d where Warn(d) == true, return d as an unperceived dangerous situation In the above example algorithm, the distance function D may be a Euclidian distance, angular distance (e.g. angular separation within a field of view), or other distance function that is useful for the sensor modalities used. The time difference function E used may take many forms, e.g. it could simply be an absolute value, but may be selected for added functionality, for instance returning different values if T(d) <T(f) or if T(d)>T(f). The cutoff value may be allowed to vary with the potential severity of the dangerous situation. The time intervals tD and tF do not necessarily terminate at the current time. For instance, the system may give the vehicle operator a chance to recognize a threat before generating an alert, for example by setting tD to go from [−5, +1] seconds measured relative to the current time.

Any predetermined time period may be variable according to conditions, for example inversely correlated with vehicle speed and/or time to possible hazard realization (such as a collision). For example, hazard location data may include hazard locations over a first predetermined time period, the driver awareness data may correspond to driver awareness over a second predetermined time period, and the first and second predetermined time periods may each having a duration of between approximately 0.01 seconds and approximately 10 seconds. Average visual flicker fusion of 30 Hz (the visual integration rate of primate vision at which 2 flashes blur to be observed as a single extended flash) corresponds to an ~0.03 second time window, so the 0.01 second window supports even unusually good visual temporal discrimination, as great as 100 HZ.

Environment Sensor System

Environment sensors used to determine the external environment of the vehicle may include video cameras, laser sensors such as lidar, radar, other image based sensors, sonar, and the like.

The environment sensor system may be operable to create a detailed representation of the vehicle environment. For example, a plurality of radar sensors may surround the vehicle. In some examples, the vehicle may receive data from nearby vehicles, for example speed and heading data from neighboring vehicles in the same and adjacent lanes.

The environment sensor can be configured to detect objects within the environment, including other vehicles and roadside objects such as pedestrians, signage, and the like.

The environment sensor system may further comprise a processing module, such as a computer or other electronic circuit, used to analyze sensor signals and determine the position of objects within the environment. The processing module may further identify potentially hazardous objects based on the present vehicle behavior, the relative position of the objects to the present vehicle, and the behavior of the objects (such as relative velocity, direction, acceleration, and the like).

The environment may be modeled in three dimensions, or as a two-dimensional representation. The two-dimensional representation may provide computational simplicity.

In some examples, predetermined data such as network data including map data can be communicated to the vehicle. In such examples, the data receiving mechanisms correspond to the function of environment sensors, as they receive data related to the vehicle environment. For example, street views that have previously been collected can be used for detection of fixed hazards such as traffic control signals.

The environment sensor system may include a sensor processing module, receiving sensor signals and detecting objects within the environment. All or some of the identified objects may be identified as hazards. The output of the processing module may include a set of hazard locations within the environment, for example hazards detected within a first time period. The first time period may extend from a past start time (such as 1-10 seconds prior to a current time) to the current time, or in some examples exclude the most recent time interval.

Driver Monitor

The driver monitor may comprise one or more driver monitor sensors, and may include video sensors (e.g. CMOS sensors), time-of-flight sensors such as ultrasound or laser sensors. IR or other illumination of the driver can be used to enhance driver monitor sensitivity. The driver monitor outputs driver awareness data, which may be a determination of driver awareness focus (e.g. gaze direction) over a predetermined time period. Hence, the driver awareness data may include gaze track data for the driver.

In some examples, a computer vision system can be used to monitor the orientation of the driver's head. By registering the projected gaze direction with the sensed environment, it is possible to estimate which hazards the driver is aware of perceived hazards, and which hazards are outside the awareness of the driver.

Gaze tracking can be accurately determined using a pair of spectacles-like equipment, having a camera facing outwards towards the environment, and further image sensors directed towards the eyes. Such equipment is cumbersome for routine use, and may be used for calibration of computer vision systems or other image based systems of driver monitoring. Alternative gaze tracking systems may instead use one or more cameras mounted facing the driver and registered relative to sensing systems observing the outside environment in which the vehicle is found. Or gaze tracking systems may use additional modes of gaze and head orientation detection, such as contact lenses with impregnated coils situated in frames producing RF transmissions, or other such systems as may be reasonably used to determine the orientation of the head and eye or eyes relative to the vehicular or environmental reference frame. Many types of orientation systems are well known as standard eye tracking technologies, and none of the descriptions of gaze trackers provided here are meant to limit the selection of trackers that may be chosen to serve the gaze detection function in the larger safety system described in examples of the invention.

In some examples an outward facing camera mounted on the vehicle dashboard may be used to estimate the vehicle environment as seen by the driver. This image may be compared with the environment model created using external vehicle sensors.

A standard coordinate transformation can be used to register the driver's viewpoint with the environment model created by the vehicle sensors. The accuracy of a gaze tracking within the environment model may be within 15 degrees, in some examples within 10 degrees, and in some examples within 5 degrees. The more accurate the gaze track data, the more reliable the estimate of driver awareness.

In some examples, the attention of the vehicle operator in relation to instrument gauges can also be monitored, and an additional warning given if the vehicle operator fails to look at a warning displayed an instrument gauge. In some examples, a camera on the dashboard of the vehicle can be used as a rough approximation of gaze track.

Attention-Evaluation Module

An example attention-evaluation module is configured to receive hazard data relating to hazards within the environment, and driver awareness data related to the awareness of the driver. The attention-evaluation module compares the detected hazards with the driver awareness data to determine perceived hazards (within the driver awareness) and unperceived hazards (outside the driver awareness). The example attention-evaluation module may then generate alert signals relating only to the unperceived hazards, and not to the perceived hazards. In some examples, alert signals may also include perceived hazards, for example if the hazard danger is extreme. Hence, the attention-evaluation module may identify a plurality of categories of hazards, for example perceived and unperceived hazards, and optionally insufficiently perceived hazards. For example, a fixation time may be above a first threshold (e.g. that estimated as required for awareness of hazard existence), but below a second threshold required for complete perception (e.g. less than that estimated as required to fully appreciate the hazard). An insufficiently perceived hazard may be seen, but a hazard parameter such as relative speed may not be perceived.

Hence, hazard categorization may be binary perceived versus unperceived categorization, or may include intermediate categories, and may include a continuous gradation in the degree of perception. Detection degree, if determined, may then be thresholded into two states such as "sufficiently perceived" or "insufficiently perceived", which may then be used in an equivalent manner as perceived and unperceived. Hazard categories may exist as intermediate states between completely perceived and completely unperceived. Hazards may also exist in an obscured state, so that when the gaze vector pointed at the obscured hazard, another object was in between the driver and the hazard. An obscured hazard may be categorized as perceived, unperceived, or in an intermediate category as insufficiently perceived, depending on the degree of obstruction, hazard behavior, and degree of potential hazard. An insufficiently perceived hazard may have an insufficient observation duration state, where the gaze landed somewhere on or near the object, but moved before observing enough spatial features to recognize the object (static "hazard identity" recognition), or before sampling enough temporal features to properly predict the objects behavior patterns (dynamic "motion model" construction/recognition).

The attention-evaluation module may be provided by an electronic circuit, such as a computer comprising a processor, memory, clock, and input-output components. The same electronic circuit can be used to provide sensor data processing.

Alerts and Vehicle Response

In some examples, an apparatus can be used to provide warnings to drivers of situations that may be surprising to the driver, such as unperceived hazards. For example, these warnings may include alerts related to newly emerged vehicles, or vehicle behavior that is not predictable from previous observations. An apparatus may comprise a hazard alarm, selectively providing alerts to the driver relating to unperceived hazards After detection of a hazard, an audible alert such as a beep may be provided to the driver. In some examples, the vehicle intent is predetermined, for example through path planning, and an automated control may override human inputs to avoid a dangerous condition. For example, the vehicle may be slowed or accelerated in a similar manner to that used for automated cruise control systems. In some examples, sensors used for such automated systems may be used to determine the environment model for examples of the present invention.

Advantages of examples of the present invention include a reduction in alerts, hence avoiding overwhelming the driver with unnecessary alerts. If a driver is known to be aware of an external hazard, no warning need be given (unless, in some examples, the hazard is particularly severe). Warnings are only given when the system determines that the warnings would be truly useful, for example when the driver has not looked in the direction of the hazard, or for example where a hazard is newly emerged into the environment, or where a recent change in the environment has created an as-yet-unobserved potential hazard situation.

In some examples, the system may monitor the driver's awareness of alerts given by vehicle systems such as gages. For example the system may determine whether the driver has looked at the speedometer, and provide alerts if the vehicle speed is in excess of the local speed limit. However, if the driver is known to be aware of the current speed and has chosen to ignore this information, no alert need be given.

In some examples, emergency braking or evasive control maneuvers may be input to vehicle controls, for example if the vehicle sensor system detects a newly emerged vehicle or other extremely hazardous situation, and the driver monitoring indicates that the driver is unaware of the dangerous situation.

Driver Memory Models

Optionally, a model of the driver memory may be used to determine the driver's awareness. For example, a driver memory model may include models of situational awareness in terms of gaze patterns, minimum fixation times required for awareness, memory retention times, memory capacity (for example, including parameters such as the maximum number of hazards that a driver can simultaneously retain in short term memory), and other parameters as appropriate.

In some examples, the model of the driver memory, and other parameters such as gaze tracking parameters used within a computer vision system, may be selected from a set of stored data corresponding to one or more drivers. For example, a system may recognize the identity of the driver, or the driver may enter such identity information, and the corresponding data retrieved from a database.

Examples of the present invention include apparatus and methods that track the state of the driver's knowledge, for example, by analyzing whether a driver has seen a hazard, such as an impending obstacle. For example, a driver may be unaware of one or more hazards because of a distraction (such as cell phone use, talking to other passengers, or presence of attention-grabbing sights near the vehicle), incapacity (such as tiredness), some other failure to pay attention, or in some cases because of momentary oversight. Examples of the present invention can provide useful warnings regardless of the source of the lack of awareness. The vehicle's environment sensors can detect other vehicles, pedestrians, or other hazards and compare the sensed external world with a recent history of what the driver has been looking at, as measured by a driver monitor, such as in-vehicle sensors.

For example, if a system determines that the driver is unaware of a hazard, then the system can respond by alerting the driver, and/or planning and executing safe trajectories in real time. Such a response need not be a predetermined response, but may be computed rapidly (e.g. under 50 ms) when driver's lack of awareness is inferred.

Examples of the present invention may have additional functionalities, such as detection of tired or inebriated drivers from the parameters of the gaze track, other driver behaviors or driver responses to observed hazards. However, unlike conventional approaches to detecting tiredness or inebriation in drivers, examples of the present invention can provide useful warnings even when a driver is fully capable, but is unaware of a hazard due to oversight or unavoidable circumstances (for example, a vehicle entering the vehicle environment from a location previously concealed from the driver). Hazards can arise even when drivers are not tired or inebriated, but rather when drivers are (for whatever reason) unaware of something in their environment and examples of the present invention can give suitable warnings in these cases.

Examples of the present invention combine driver awareness monitoring with external vehicle environment sensing to provide improved warnings to the driver, and optionally vehicle control inputs to avoid a collision.

Examples of the present invention are great improvements over conventional blind spot detectors, as unperceived hazards may be located anywhere in the vehicle environment. In any case, depending on driver's state (e.g., conventional posture and full awareness, on a cell phone, or leaning over to reach something), the true blind spot for the driver may be different from the usual blind spot configuration caused by the vehicle roof supports. External sensors can track many, most, or all objects in the environment, determine which objects are hazards, and dynamically track whether the driver is aware or unaware of each hazard, based on the driver's gaze track and the behavior of the objects.

The invention is not restricted to the illustrative examples described above. Examples described are not intended to limit the scope of the invention. The scope of the invention is defined by the scope of the claims.

Having described our invention, we claim:

1. An apparatus for assisting safe operation of a vehicle, the vehicle having a vehicle environment, the apparatus comprising:
    an environment sensor system, operable to detect hazards within the vehicle environment and to provide hazard data;
    a driver monitor, operable to provide driver awareness data, the driver awareness data including a gaze track; and
    an attention-evaluation module, identifying perceived hazards and unperceived hazards by comparing the hazard data and the gaze track,
    the attention-evaluation module providing an alert signal relating to the unperceived hazards,
    the attention-evaluation module including an electronic circuit having a processor,
    the processor operable to execute an algorithm comparing hazard location data with the gaze track,
    the algorithm including a model of driver memory, the model of driver memory including a minimum fixation time required for awareness, a memory retention time, and a memory capacity,
    the electronic circuit being operable to estimate driver awareness using the model of driver memory.

2. The apparatus of claim 1, further comprising a hazard alarm providing an alert on receiving the alert signal.

3. The apparatus of claim 1, the hazard data including hazard location data,
    an unperceived hazard having a hazard location outside a predetermined distance from the gaze track.

4. The apparatus of claim 3, wherein the predetermined distance is a predetermined angular distance from the gaze track.

5. The apparatus of claim 3, the hazard location data corresponding to hazard locations over a first predetermined time period,
    the driver awareness data corresponding to driver awareness over a second predetermined time period,
    the first and second predetermined time periods each having a duration of between approximately 0.01 seconds and approximately 10 seconds.

6. The apparatus of claim 1, the driver awareness data further including eye fixation time data,
    at least some hazards requiring an appreciable eye fixation time to be identified as perceived hazards.

7. The apparatus of claim 1, the environment sensor system including a radar sensor.

8. The apparatus of claim 1, the hazards including other vehicles in the vehicle environment.

9. The apparatus of claim 1, the driver monitor including:
    at least one image sensor, providing image data;
    a processing module operable to determine a gaze direction from the image data.

10. The apparatus of claim 1, further comprising a vehicle control module operable to adjust vehicle operation in response to unperceived hazards.

11. An apparatus for assisting safe operation of a vehicle, the vehicle having a vehicle environment, the apparatus comprising:
    an environment sensor system, operable to detect hazards within the vehicle environment and provide hazard data, hazard data including hazard location data,
    the hazards including other vehicles in the vehicle environment;
    a driver monitor, the driver monitor including a gaze tracker and providing gaze track data including a gaze track;
    an attention-evaluation module, operable to receive the hazard data and the gaze track data, and to identify unperceived hazards by comparing the hazard locations and the gaze track,
    the attention-evaluation module including an electronic circuit having a processor,
    the processor operable to execute an algorithm comparing hazard location data with the gaze track,
    the algorithm including a model of driver memory, the model of driver memory including a minimum fixation time required for awareness, a memory retention time, and a memory capacity,
    the electronic circuit being operable to estimate driver awareness using the model of driver memory; and
    a hazard alarm providing alerts to the driver relating to the unperceived hazards.

12. The apparatus of claim 11,
    the environment sensor system including radar sensors supported by the vehicle,
    the driver monitor including a computer vision system operable to determine a gaze track from the image data relating to the driver,
    the vehicle being a land vehicle.

13. The apparatus of claim 11, the attention-evaluation module identifying perceived hazards and unperceived hazards by comparing the hazard locations and the gaze track over a predetermined time period,
    perceived hazards being within a predetermined distance from the gaze track during the predetermined time period,
    the predetermined distance being a predetermined angular separation.

14. The apparatus of claim 11, the gaze track data including eye fixation data relating to the driver,
    the attention-evaluation module being operable to identify unperceived hazards by comparing the hazard locations and the eye fixation data.

15. A method for assisting safe operation of a vehicle by a driver, the method comprising:
    monitoring the vehicle environment using environment sensors supported by the vehicle, so as to obtain hazard data;
    monitoring the driver, so as to obtain driver awareness data, the driver awareness data including gaze direction data;
    determining driver awareness from the driver awareness data, using a model of driver memory, the model of driver memory including a minimum fixation time required for awareness, a memory retention time, and a memory capacity;
    comparing the hazard data and the driver awareness so as to identify unperceived hazards,
    identification of unperceived hazards using an electronic circuit having a processor, the processor executing an algorithm comparing hazard location data with the gaze track,
    the algorithm including the model of driver awareness; and providing alerts to the driver relating to the unperceived hazards.

16. The method of claim 15, wherein the gaze direction data includes a gaze track over a predetermined time period, the gaze track fixating the perceived hazards during the predetermined time period.

17. The method of claim 15, wherein the gaze direction data includes a fixation data,
the method including comparing the hazard location data and the fixation data to identify unperceived hazards.

* * * * *